UNITED STATES PATENT OFFICE.

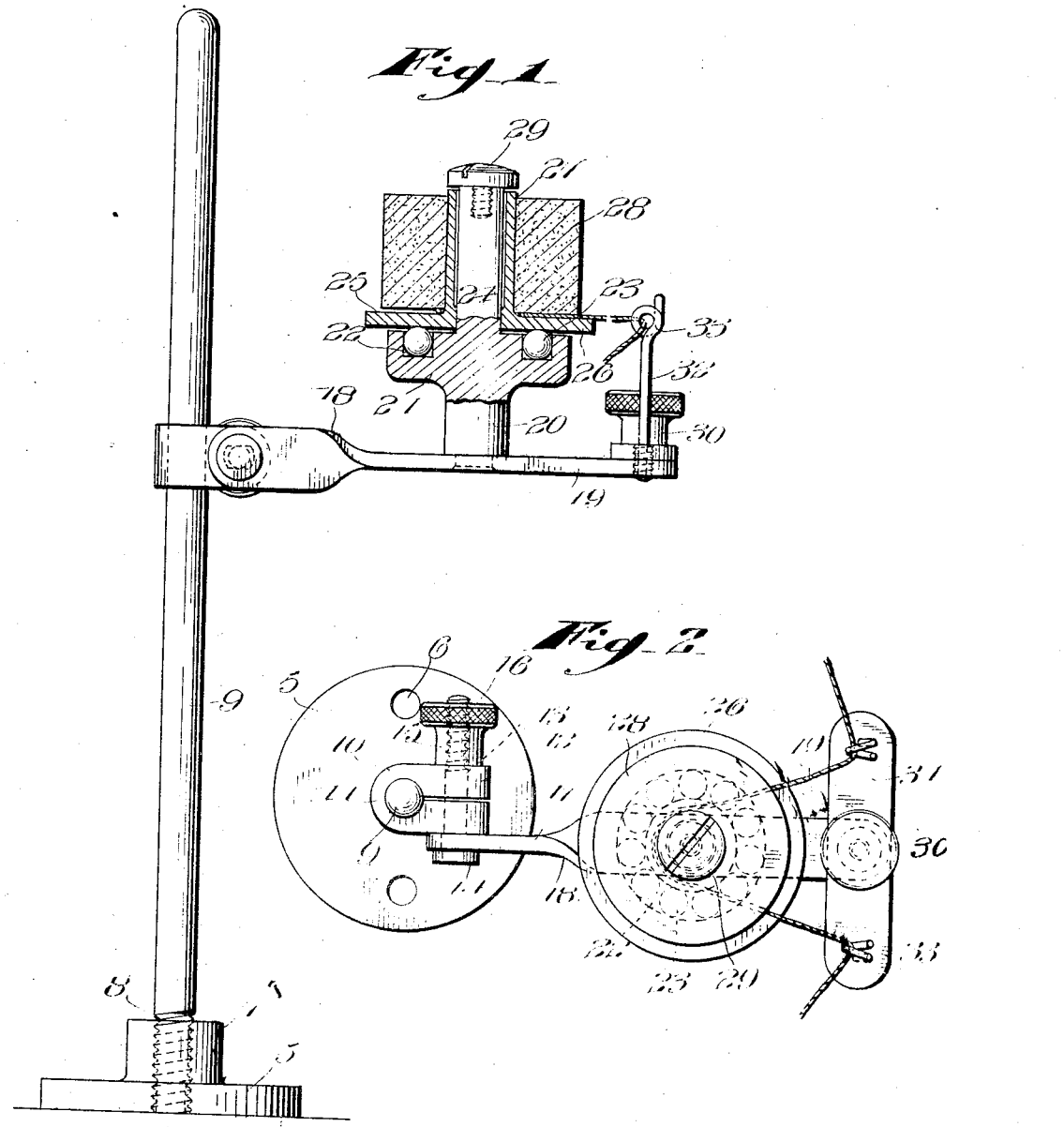

ARTHUR B. RAPINE, OF NORRISTOWN, PENNSYLVANIA.

WAXING DEVICE.

1,098,302. Specification of Letters Patent. Patented May 26, 1914.

Application filed July 17, 1912, Serial No. 709,946. Renewed April 11, 1914. Serial No. 831,340.

*To all whom it may concern:*

Be it known that I, ARTHUR B. RAPINE, a citizen of the United States, residing at Norristown, in the county of Montgomery and State of Pennsylvania, have invented new and useful Improvements in Waxing Devices, of which the following is a specification.

The general object of this invention is the provision of a thread waxing device particularly adapted to be applied to a sewing machine of an approved structure, said device being mounted upon the machine at a point intermediate the spool of thread and the needle whereby the thread may be thoroughly waxed before reaching said needle.

In carrying out the object of the invention generally stated above, it will be understood, of course, that the essential features thereof are susceptible to changes in details and structural arrangement, one preferred and practical embodiment being shown in the accompanying drawing, wherein:—

Figure 1 is a side elevation of the device, showing the same partly in section and constructed in accordance with the invention. Fig. 2 is a top plan view thereof.

Referring more particularly to the accompanying drawing in which like reference characters designate similar parts, it will be seen that the invention comprises a circular base 5 having openings 6 therein for the reception of suitable fasteners whereby said base may be secured to the machine at a point intermediate the spool of thread and the needle. The base 5 is provided with an enlarged portion 7 having a central threaded opening therein for the reception of the threaded end 8 of a standard 9.

An adjustable collar 10 is adapted for longitudinal movement upon the standard 9 and is provided with an opening 11 for the reception thereof. The collar 10 is bifurcated to provide a pair of extensions 12 which are provided with alined transverse openings adapted to receive a screw bolt 13 having a head 14 and threaded upon the bolt 13 is a thumb nut 15 having a milled portion 16 whereby said nut may be tightened upon the bolt thus clamping the extension arms 12 together in order to securely retain the collar in engagement with the standard whereby movement of the former will be prevented.

Interposed between the head 14 and the adjacent extension 12 of the collar is one end of a laterally extending bracket 17 which is held in a substantially horizontal position by means of the thumb nut 15 when the same is tightened. The bracket 17 is twisted intermediate its length as indicated at 18 to provide a flat portion 19 which carries a bearing post 20 having an enlarged circular portion 21 at its free end. Adjacent the periphery of the circular portion 21, the same is provided with an annular groove 22 which forms a ball bearing race which is adapted to receive a plurality of ball bearings 23. A spindle 24 extends from the center of the circular portion 21 and is adapted to have loosely mounted thereon the element 25 which comprises a disk 26 adapted to frictionally engage the ball bearings 23 and a sleeve 27 which encircles the said spindle. A block of wax 28 having a central opening therein is adapted to be mounted upon the sleeve 27 and said sleeve is prevented from becoming detached from said spindle by means of a screw 29 threaded in the outer end of the latter.

The outer extremity of the flange portion 19 of the bracket 17 has secured thereto, by means of a nut 30, a transverse supporting arm 31. Extending from said arm adjacent each end thereof is a vertically arranged rod 32 having its upper free end bent to form an eye 33. Before inserting the thread into the needle of the machine, the free end thereof may be passed through one of the eyes 33 and then inserted between the block of wax 28 and the disk portion 26 of the element 25 and given a half turn around the sleeve 27 and then passed through the other eye 33 after which the same may be threaded into the needle. After the machine is started, the thread is drawn from the spool in the usual well known manner and owing to the fact that the element 25 is rotatably mounted upon the spindle 24, it will be seen that the thread will be free to pass around the sleeve 27, and owing to the engagement of the block of wax 28 with the thread, it will be seen that the latter is automatically waxed so that when the same has reached the needle it is strengthened and the efficiency thereof is greatly improved.

From the foregoing description taken in connection with the accompanying drawing, it will be seen that the invention contemplates providing a waxing device which is simple in construction thus reducing the cost of manufacture of the same to a minimum and which is durable and effective in carrying out the purpose for which it is designed.

What is claimed is:—

An attachment of the class described comprising a standard, a laterally extending bracket carried thereby and a bearing post carried by said bracket, a rotatable element supported upon the post, a block of wax mounted upon said element, a supporting arm mounted transversely upon the outer end of said bracket, vertical rods carried by said supporting arm and having their free ends bent to form eyes for the reception of a thread, said thread being interposed between said block of wax and said rotatable element.

In testimony whereof I affix my signature in presence of two witnesses.

ARTHUR B. RAPINE.

Witnesses:
G. CARROLL HOOVER,
JESSE L. WIEDINMYER.